(12) United States Patent
Thornton et al.

(10) Patent No.: US 8,393,791 B2
(45) Date of Patent: Mar. 12, 2013

(54) BEARING SIDE FACE ELECTRICAL ISOLATION

(75) Inventors: Gregory J. Thornton, Issaquah, WA (US); Mark Barr, Seattle, WA (US); Mark E. Smith, Renton, WA (US)

(73) Assignee: The Boeing Company, Chicago, IL (US)

(*) Notice: Subject to any disclaimer, the term of this patent is extended or adjusted under 35 U.S.C. 154(b) by 861 days.

(21) Appl. No.: 12/542,307

(22) Filed: Aug. 17, 2009

(65) Prior Publication Data

US 2011/0038576 A1 Feb. 17, 2011

(51) Int. Cl.
*F16C 17/24* (2006.01)

(52) U.S. Cl. .................. 384/277; 384/476; 384/192

(58) Field of Classification Search .......... 384/277, 384/476, 192, 206, 213, 215, 220, 236, 582
See application file for complete search history.

(56) References Cited

U.S. PATENT DOCUMENTS

| | | | | |
|---|---|---|---|---|
| 2,370,173 | A | * | 2/1945 | Kendall ............ 384/513 |
| 3,672,734 | A | * | 6/1972 | Bando ............ 384/536 |
| 4,080,015 | A | | 3/1978 | Greby et al. |
| 4,854,751 | A | * | 8/1989 | Grassmuck et al. ....... 384/537 |
| 5,059,041 | A | * | 10/1991 | Watanabe et al. ......... 384/476 |
| 6,030,128 | A | * | 2/2000 | Pontzer ............ 384/476 |
| 7,503,697 | B2 | * | 3/2009 | Tsuji et al. ............ 384/476 |
| 2008/0040886 | A1 | | 2/2008 | Arnold et al. |

FOREIGN PATENT DOCUMENTS

| | | |
|---|---|---|
| DE | 8029066 U1 | 2/1981 |
| DE | EP0494446 A1 | 7/1992 |
| DE | 102004035212 A1 | 2/2006 |

OTHER PUBLICATIONS

International Search Report and the Written Opinion of the International Searching Authority mailed on Oct. 28, 2011 for PCT Application No. PCT/US2010/043553 filed on Jul. 28, 2010—International Searching Authority—European Patent Office.

* cited by examiner

*Primary Examiner* — Thomas R Hannon
(74) *Attorney, Agent, or Firm* — Ameh IP; Elahe Toosi; Lowell Campbell (57) ABSTRACT

A method of providing conditional electrical isolation for a bearing is disclosed. An inner race coupled to a first structure and an outer race coupled to a second structure are provided. An isolative means is provided for conditionally electrically isolating the first structure from the second structure.

11 Claims, 8 Drawing Sheets

BEARING SIDE FACE ELECTRICAL ISOLATION

FIELD

Embodiments of the present disclosure relate generally to plain bearings. More particularly, embodiments of the present disclosure relate to providing electrical isolation in a bearing.

BACKGROUND

In order to reduce weight and increase structural strength, aircraft are increasingly using composite materials, which often are non-conductive or partially conductive. Aircraft also have to manage electrical currents caused by electromagnetic effects (EME) such as those caused by lightning, radio towers, and static discharge (e.g., air caused) by providing conductive paths and electrical isolation where required. EME effects such as lightning may have large currents and high voltages capable of producing electrical arcing across exposed surfaces. In aircraft made with partially or non-conductive composite materials, good electrical paths are required to dissipate EME energy, and good electrical isolation is required to protect sensitive equipment and fluids. Bonding and grounding requirements for aircraft electrical systems such as wing ice protection systems must also be provided for.

Leading edge structures such as slats with track arms and other aircraft structures are generally designed to have grounding paths to dissipate EME energy. However, for normal operation, the electrical system has a current return network for grounding the electrical system. It may be desirable that the electrical system conduct ground current through the current return network during normal operation and not through the aircraft structure ground paths used for EME effects.

A structural connection of a leading edge slat to a track arm may utilize bearings with a lubricant that is non-conductive or partially conductive to normal ground currents. This provides the resistance to normal grounding currents, while accommodating EME effects with sufficient power to break though the resistive barrier of the non-conducting lubricant. In such a structure, a ground path through a bearing may have resistance to grounding currents, but areas around the bearing lubricant could be places where sufficiently high voltages and currents may cause electrical arcing through air gaps around the metal bearing parts. One existing solution is to include attachment points on the structures to incorporate flexible electrical jumpers to provide an electrical ground path. However, this requires additional cost, design, assembly, maintenance checks, and added weight to the aircraft. Another existing solution is to paint sealant around exposed bearing parts. The reliability of this procedure may be less than desired, and sealant may not be compliant enough to allow a bearing to function properly during cold temperatures.

Therefore, there is a need for bearings that provide reliable, low cost, easy-to-maintain isolation from normal electrical currents and voltages, while accommodating overflow currents from EME effects.

SUMMARY

A bearing operable to provide conditional electrical isolation is disclosed. The bearing comprises an inner race or ball and an outer race or ring. A conditionally non-conductive material is inserted between or coated on parts of the bearing to provide electrical isolation for lower voltages for bonding and grounding purposes, while providing a conductive path for electromagnetic effects purposes such as conducting large voltages of lightning strikes.

In a first embodiment, a system conditionally isolates electrical current in an aircraft structure. A bearing is coupled to a first structure, and the bearing comprises an inner race coupled to the first structure and an outer race coupled to the inner race. A second structure is coupled to the outer race, and a conditionally non-conductive means conditionally electrically isolates the first structure from the second structure.

In a second embodiment, a method provides conditional electrical isolation for a bearing. An inner race of the bearing is provided and coupled to a first structure, and an outer race of the bearing is provided and coupled to a second structure. A means of isolation is provided for conditionally electrically isolating the first structure from the second structure.

In a third embodiment, a bearing comprises an inner race and an outer race comprising an outer-race inner surface and an outer-race side face. A conditionally non-conductive material on the outer-race inner surface and the outer-race side face provides conditional electrical isolation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft control systems, electrical systems, bearings, high lift devices, and other functional aspects of the systems (and the individual operating components of the systems) may not be described in detail herein. In addition, those skilled in the art will appreciate that embodiments of the present disclosure may be practiced in conjunction with a variety of different aircraft control systems, electrical systems and aircraft wing configurations, and that the system described herein is merely one example embodiment of the disclosure.

Embodiments of the disclosure are described herein in the context of practical non-limiting applications, namely, aviation parts. Embodiments of the disclosure, however, are not limited to such aviation applications, and the techniques described herein may also be utilized in other bearing applications. For example, embodiments may be applicable to car suspensions, drive shafts, heavy machinery, and sewing machines.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
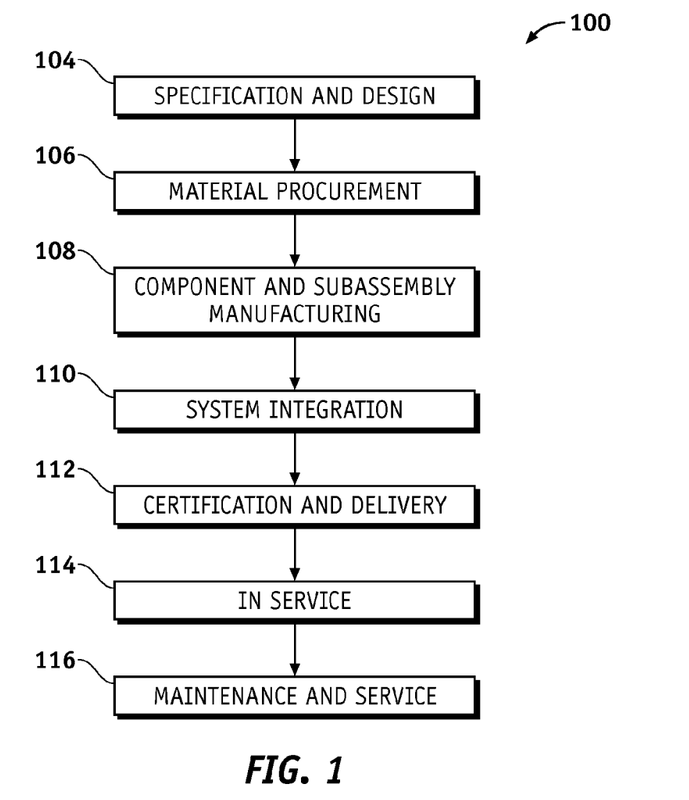
FIG. 1 is an illustration of a flow diagram of an exemplary aircraft production and service methodology.
Figure 2:
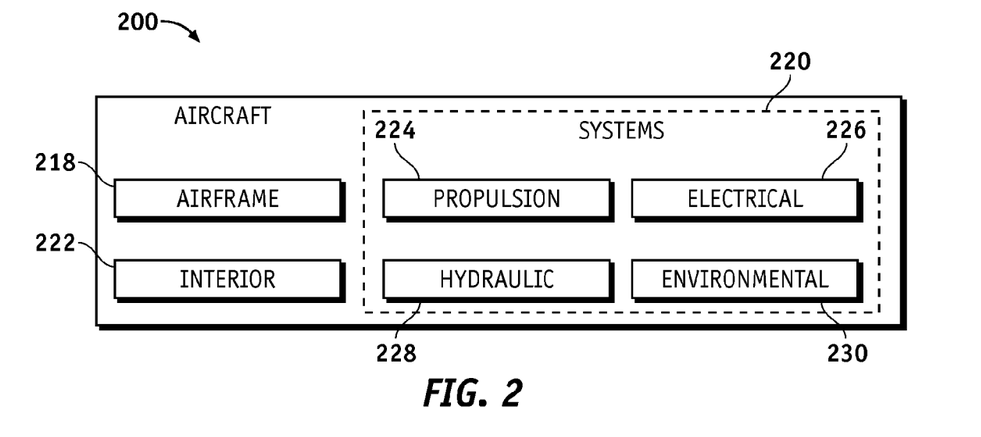
FIG. 2 is an illustration of an exemplary block diagram of an aircraft.

Referring more particularly to the drawings, embodiments of the disclosure may be described in the context of an aircraft manufacturing and service method 100 as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Aircraft may be susceptible to lightning or other high energy electromagnetic effects (EME). This problem is further complicated by use of carbon fiber-reinforced plastic (CFRP) structures, which though often conductive, may have less than optimal conductivity for high currents, such as lightning. Sufficient grounding of electrical equipment is also required for normal aircraft operation to protect sensitive equipment and preventing electrical arcing across exposed surfaces. In the event of a current leakage with electrical equipment such as a wing ice protection system (WIPS), the ground path should be sufficient that no electrical arcing can occur in an area where fuel or vapor may be present. This can be challenging if there are moveable joints (such as a bearing) in the potential ground path. The afore mentioned requirements of 1) allowing high voltage effects like lightning to ground through the structure, and 2) isolating electrical equipment ground current from movable metal parts, may often be in conflict with each other. An isolating bearing will meet requirement (2), but an electromagnetic effects (EME) safe version of the isolating bearing will meet both requirements.

Figure 3:
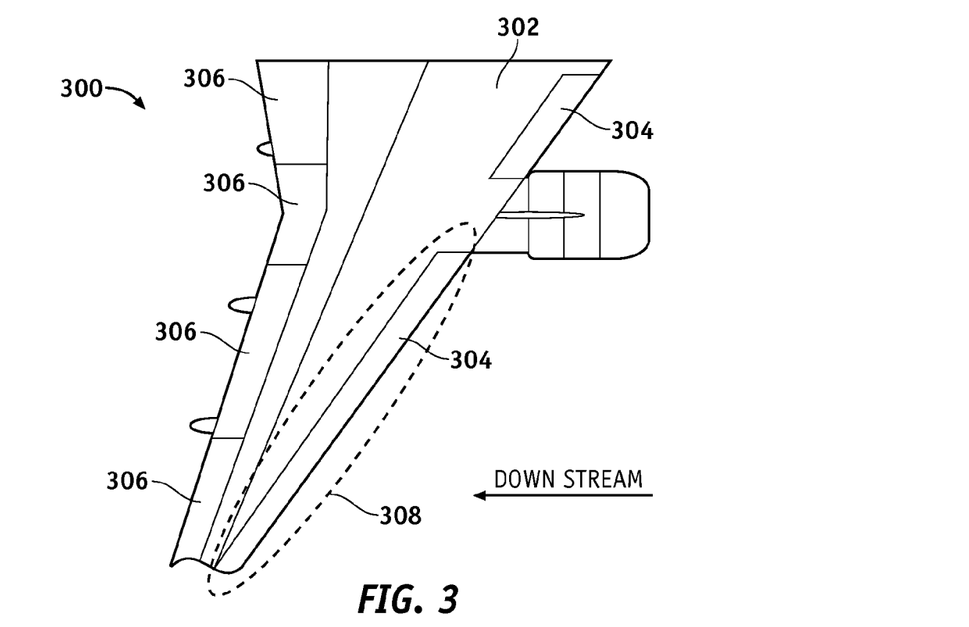
FIG. 3 is an illustration of a top view of a portion of an aircraft wing showing a plurality of slats and flaps, which may be installed using a plurality of dielectric spherical bearing assemblies.

FIG. 3 is an illustration of a top view of a portion of an aircraft wing 300 showing a plurality of leading edge slats 304 and flaps 306. The leading edge slats 304 and flaps 306 are movable external parts that may be exposed to lightning. The leading edge slats 304 use wing ice protection systems (WIPS). Because they are movable parts, leading edge slats 304 and flaps 306 are generally installed on the wing 300 using a plurality of bearing assemblies. Because the wing 300 is often used to store fuel, and fuel trucks are frequently near the wings, the leading edge slats 304 and flaps 306 and their bearings can be where no electrical arcing should occur. Thus, they may be good candidates for dielectric bearings that are resistant to electrical arcing.

Flaps 306 are aerodynamic surfaces attached to the trailing edge of the wing main element 302. When deployed, the flaps 306 increase the lift (and drag) of the wing main element 302. The flaps 306 are usually fully extended while landing. Depending on the aircraft type, configuration, and method of takeoff, flaps 306 are often partially extended for take-off to give the aircraft more lift when trying to leave the ground.

The leading edge slats 304 are aerodynamic surfaces attached to the leading edge of the wing main element 302, which, when deployed, allow the wing main element 302 to operate at a higher angle of attack. The leading edge slats 304 are usually deployed while landing, but are usually retracted in normal flight to minimize drag. For example, during take-off, the leading edge slats 304 are partially extended to provide attached flow over the wing main element 302 at high angles of attack. Shortly after take-off, the leading edge slats 304 would be retracted to improve the lift-to-drag ratio of the climbout configuration. The leading edge slats 304 may be retracted and extended by a drive track (slat track) which is supported inside the wing 300. To accommodate flexion during retraction and extension, each of the leading edge slats 304 may be coupled to its two respective slat tracks via bearings such as, for example but without limitation, two spherical bearings per slat track as explained below.

Figure 4:
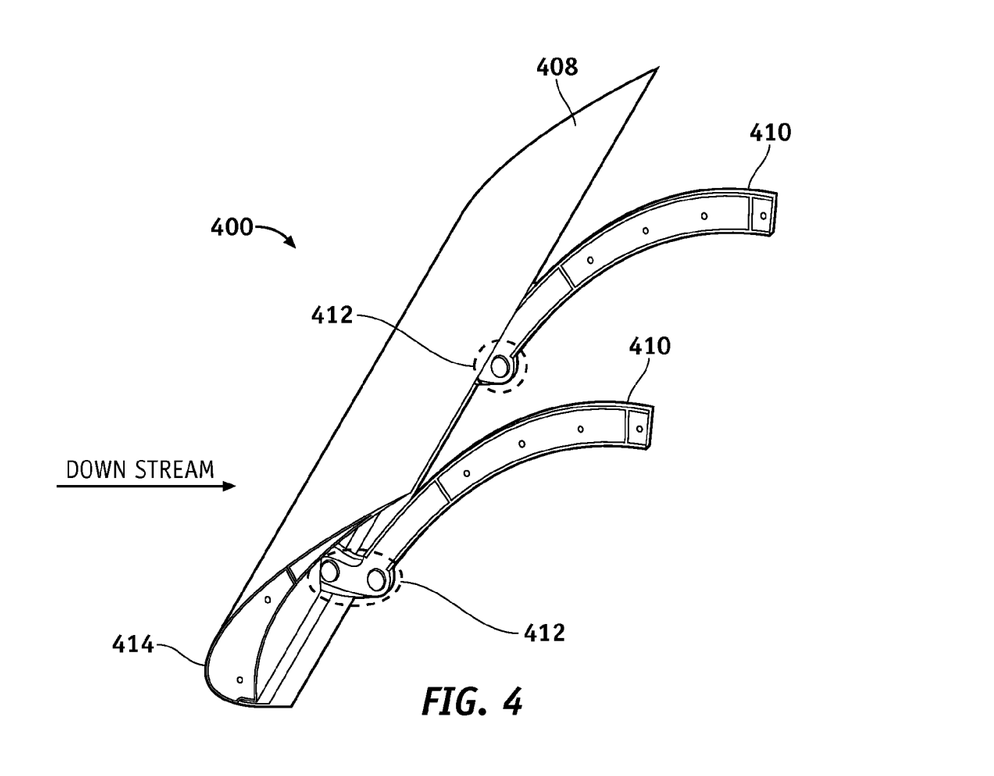
FIG. 4 is an illustration of a perspective view of an exemplary leading edge slat comprising a wing ice protection system (WIPS).
Figure 5:
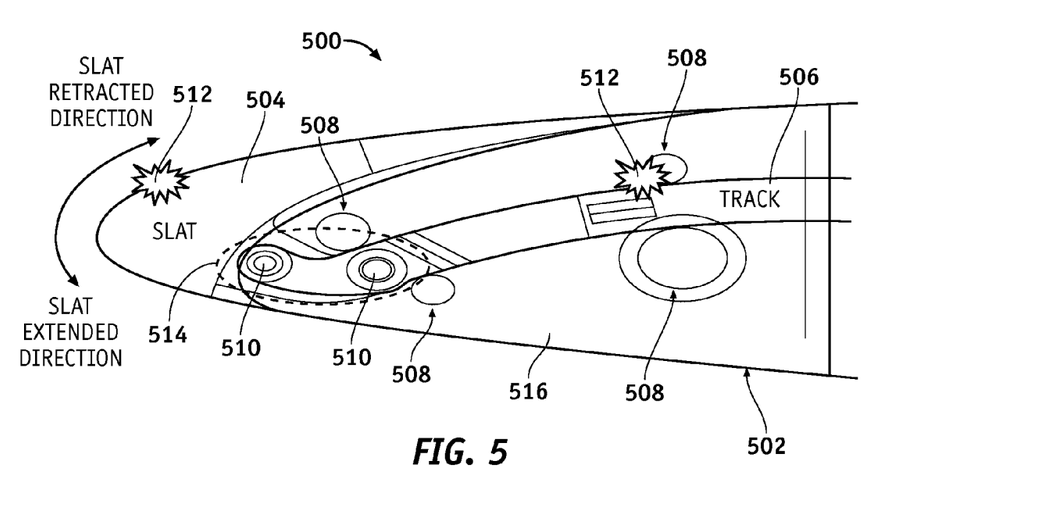
FIG. 5 is an illustration of a cross sectional view of a leading edge slat and track comprising a WIPS and showing a WIPS current leakage.

FIG. 4 is an illustration of a perspective view of an exemplary leading edge slat-to-track structure 400 (308 in FIG. 3) comprising a wing ice protection system (WIPS) 414. As shown in FIG. 4, a leading edge slat 408 is coupled to its two respective slat tracks 410 via two bearings 412 per each of the slat tracks 410 as explained in more detail below in the context of FIGS. 5 and 6. The leading edge slat 408 is retracted and extended by two drive tracks (slat tracks) 410 which are supported inside the wing 300 (FIG. 3) by rollers 508 as shown in FIG. 5 below. The WIPS 414 may take a significant amount of power and current, so the leading edge of the aircraft may need to accommodate current leakages in the WIPS 414. For example, the WIPS 414 may produce a voltage of about 230 volts and about 230 amps current in 3-phase AC.

FIG. 5 is an illustration of a cross sectional view of a leading edge slat and track 500 showing a WIPS current leakage 512. The leading edge slat and track 500 may comprise: a wing 502, a leading edge slat 504, a slat track 506, a plurality of rollers 508, and a plurality of spherical bearings 510. The leading edge slat 504 is supported by the rollers 508 located chordwise within 516 the wing 502. The rollers 508 may comprise lower front rollers and roller rings rotatably mounted at opposite sides of a rotary actuator pinion gear (not shown). The rotary actuator pinion gear engages the slat track 506 and moves the slat track 506 between the slat extended and slat retracted positions. The spherical bearings 510 allow alignment variation between two or more parts such as, for example but without limitation, leading edge slat 408 and the two respective slat tracks 410.

In the event of a current leakage with electrical equipment, a ground path of the current leakage shall be sufficient so that no electrical arcing can occur where fuel or vapor may be present. This can be challenging if there are moveable joints in the potential ground path.

Some embodiments of the disclosure as described in more detail below in the context of discussion of FIGS. 10-16 comprise a conditionally non-conductive material inserted between or coated on parts of the bearing. For example, a conditionally non-conductive spherical bearing liner (coating) covers side faces of spherical bearings or bushings to electrically isolate the outer ring (outer race) of the spherical bearing from the spherical ball (inner race). In this manner, these embodiments provide dielectric barriers from the spherical ball of the spherical bearing to the outer race of the spherical bearing 510. Thereby, embodiments of the disclosure provide electrical isolation for lower voltages for bonding and grounding purposes, while providing a conductive path for electromagnetic effects purposes such as conducting large voltages of lightning strikes.

Figure 6:
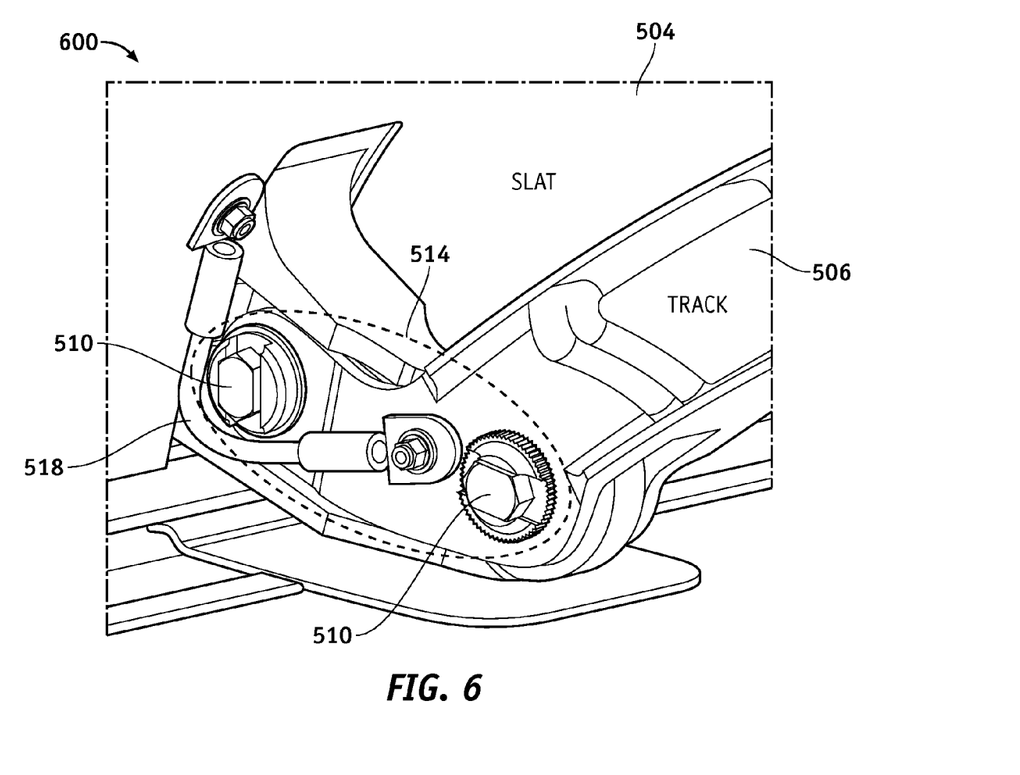
FIG. 6 is an illustration of a perspective side view of a portion of the leading edge slat and track shown in FIG. 5, where dielectric spherical bearings may be installed according to an embodiment of the disclosure.

FIG. 6 is an illustration of a perspective side view of a portion of leading edge slat and track 500 shown in FIG. 5, including single pin joints where the spherical bearings 510 (dotted lines 412 in FIGS. 4 and 514 in FIGS. 5-6) may be installed according to an embodiment of the disclosure. Sufficient grounding is required to dissipate energy from electrical equipment and lighting. According to an embodiment of the disclosure, a dielectric spherical bearing as described below can isolate current in normal use and be conductive during high-voltage-spike lightning. A ground wire 518 may be used to provide a ground path for general electrical current leakages; however, there may still be a need for another ground path across spherical bearings 510.

Figure 7:
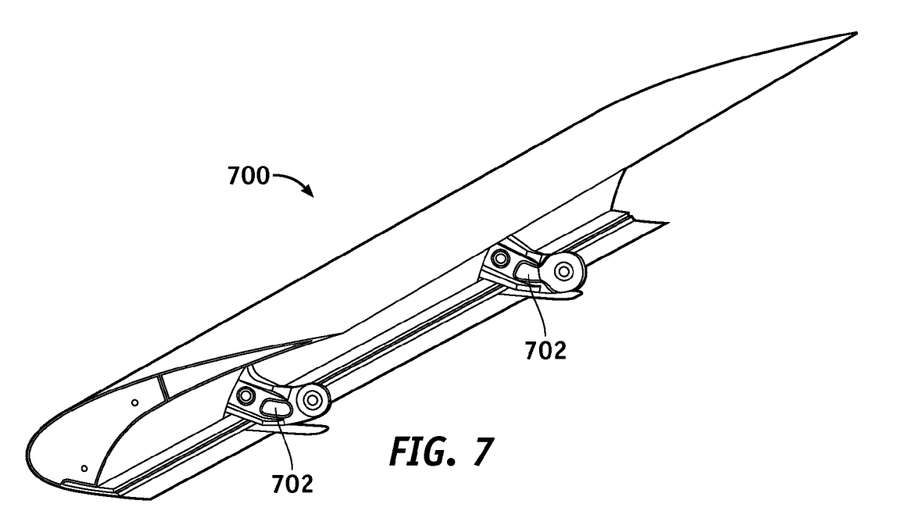
FIG. 7 is an illustration of a perspective view of an exemplary leading edge slat assembly showing a plurality of slat-to-track attachment assemblies, where a dielectric spherical bearing may be installed according to an embodiment of the disclosure.

FIG. 7 is an illustration of a perspective view of an exemplary leading edge slat assembly 700 showing a plurality of slat-to-track attachment assemblies 702 where the spherical bearings may be installed according to an embodiment of the disclosure. As mentioned above, EME can cause electrical arcing around a bearing, where an arc occurs from the outer ring of the spherical bearing to the inner race or ball, and also from the outer ring (outer race) of the ball to a pin (not shown) connecting the bearing to the slat track 506 (FIG. 5). Embodiments of the disclosure as described in more detail below comprises a conditionally non-conductive spherical bearing liner (coating) that covers side faces of spherical bearings or bushings to electrically isolate the outer ring of the spherical bearing from the spherical ball. In this manner, these embodiments provide dielectric barriers from the spherical ball of the spherical bearing to the outer ring of the spherical bearing 510, and from other attachment hardware such as pins or bolts. The dielectric spherical bearing 510 with polytetrafluoroethylene (PTFE) (TEFLON) liners can prevent current from conducting through the slat rack 506, and the current can be managed through a conductive ground path.

Figure 8:
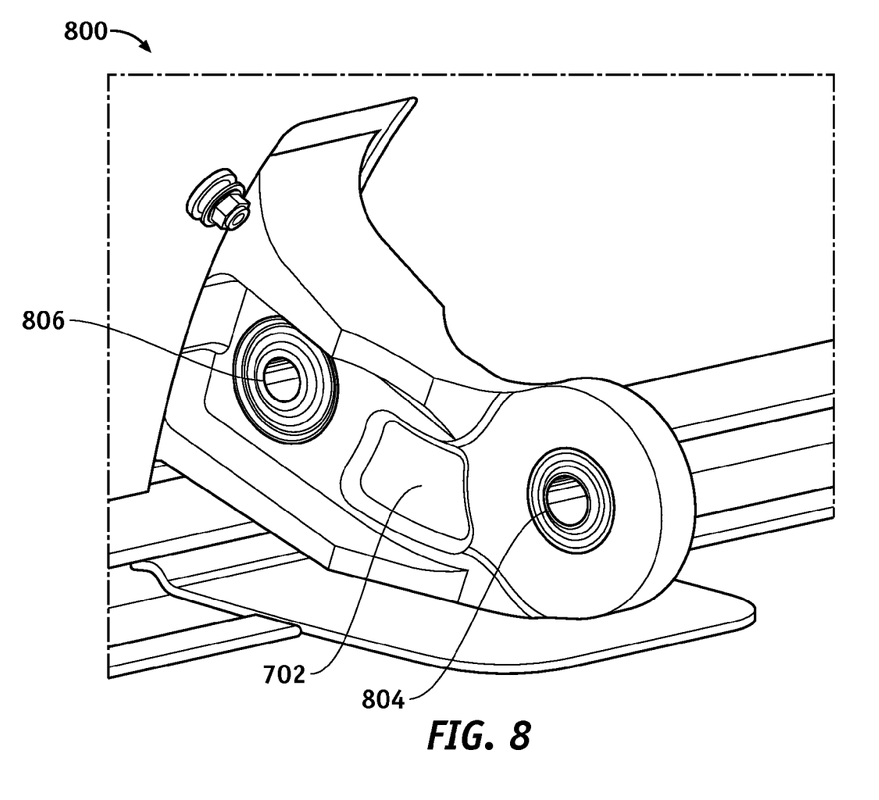
FIG. 8 is an illustration of an enlarged perspective side view of an exemplary slat-to-track attachment assembly shown in FIG. 7, where a dielectric spherical bearing may be installed according to an embodiment of the disclosure.

FIG. 8 is an illustration of an enlarged perspective side view 800 of an exemplary slat-to-track attachment assembly 702 shown in FIG. 7 where a spherical bearing 804 and a spherical bearing 806 may be installed according to an embodiment of the disclosure.

A bearing is a device to allow alignment variation between two or more parts, typically rotation or linear movement. Bearings may be classified broadly according to the motions they allow and according to their principle of operation as well as by the directions of applied loads they can handle. Plain bearings are very widely used, and use surfaces in rubbing contact, often with lubrication. A spherical bearing is a bearing that permits angular rotation about a central point in two orthogonal directions (usually within a specified angular limit based on the bearing geometry). Typically these bearings support a rotating shaft in a bore of the inner ring that move rotationally, but can also move at an angle.

Construction of spherical bearings can be hydrostatic or strictly mechanical. A spherical bearing by itself can consist of an outer ring (outer race) and an inner ring (inner race or ball) and a locking feature that makes the inner ring (outer race) captive within the outer ring (outer race) in an axial direction. An outer surface of the inner ring and an inner surface of the outer ring are collectively considered the raceway where and they slide against each other, with a lubricant or a maintenance-free PTFE (TEFLON) based liner. Some spherical bearings incorporate a rolling element such as a race of ball-bearings, allowing lower friction.

Spherical bearings are used in countless applications, wherever rotational motion should be allowed to change the alignment of its rotation axis. A prime example is a tie rod on a vehicle suspension. The mechanics of the suspension allow the axle to move up and down, but the linkages are designed to control that motion in one direction and they should allow motion in the other directions. Spherical bearings have been used in aircraft moving surfaces, car suspensions, driveshafts, heavy machinery, sewing machines, and many other applications.

Figure 9:
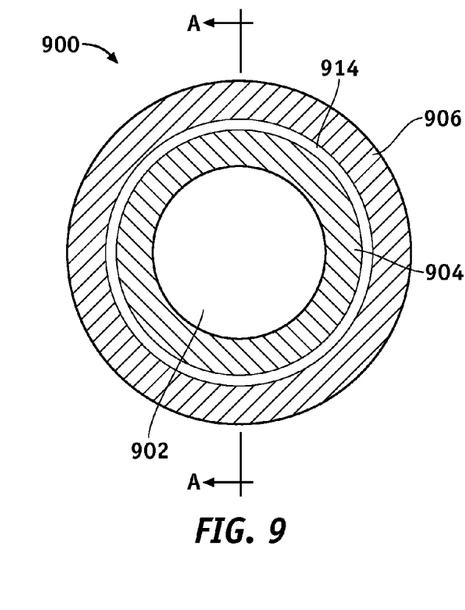
FIG. 9 is an illustration of a perspective side view of an exemplary dielectric spherical bearing according to an embodiment of the disclosure.
Figure 10:
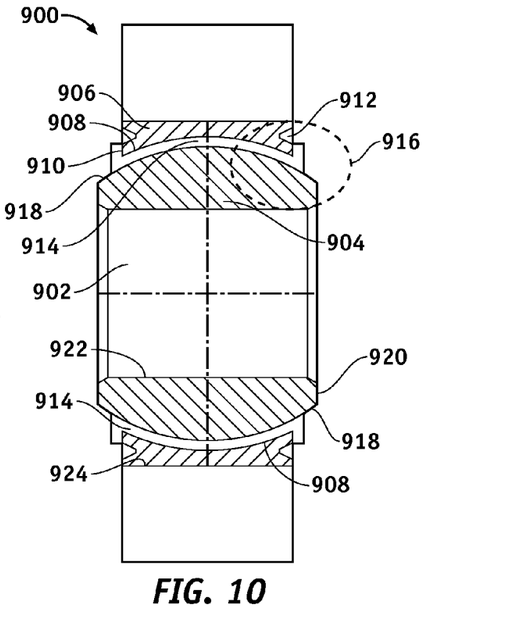
FIG. 10 is an illustration of a cross sectional view of the exemplary dielectric spherical bearing taken along section A-A of FIG. 9 according to an embodiment of the disclosure.
Figure 11:
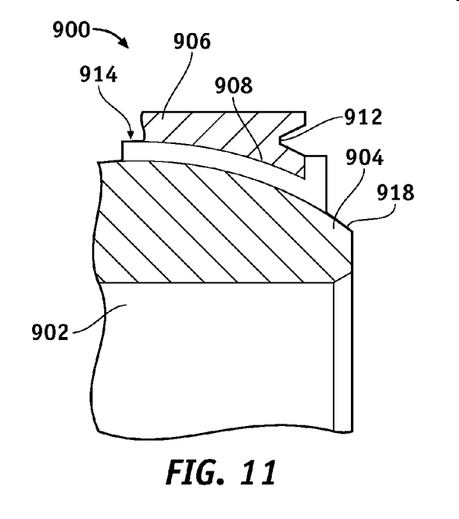
FIG. 11 is an illustration of an expanded cross sectional view of a portion of the exemplary dielectric spherical bearing of FIG. 10 according to an embodiment of the disclosure.

FIGS. 9-11 illustrate a side view, a cross sectional view, and a portion (916 in FIG. 10) of an exemplary EME isolating dielectric spherical bearing 900 according to an embodiment of the disclosure respectively. The dielectric spherical bearing 900 may generally comprise a central opening 902, an inner race 904, an outer race 906, and a conditionally non-conductive bearing liner 914 (coating 914).

The dielectric spherical bearing 900 may be, without limitation, a concentric bearing, a spherical bearing, a cartridge bearing, and the like. In this embodiment, a metallic cartridge bearing, and in particular, a spherical plain cartridge bearing is used as an example. Because it is a movable part, the leading edge slat 408 (FIG. 4) can be installed on the wing 300 (FIG. 3) using a plurality of spherical bearings such as the dielectric spherical bearing 900 as explained below.

The central opening 902, permits the dielectric spherical bearing 900 to be connected to a coupling structure such as a pin, shaft or a rod while an inner-race outer surface 918 thereof is slidably engaged with the conditionally non-conductive bearing liner 914.

The inner race 904 may comprise an inner-race outer surface 918 (FIG. 10), an inner-race side face 920, and inner-race inner surface 922. The inner race 904 may be coupled to a first structure (i.e., slat track 506 in FIG. 5) via a coupling structure. The first structure may be, for example but without limitation, a mounting structure for a slat, a mounting structure for a flap, a mounting structure for a spoiler, and the like. The inner race 904 may have, for example but without limitation, a ball shape, a rod shape, a cylinder shape, and the like. The inner race 904 may comprise an inner race of, for example but without limitation: a ball bearing, a spherical bearing, a roller bearing, a needle bearing, a bushing, a journal bearing, and the like.

The outer race 906 may comprise an outer-race inner surface 908, an outer-race side face 910, an outer-race outer surface 924, and swaging grooves 912. The outer race 906 may be coupled to a second structure (i.e., leading edge slat 504 in FIG. 5). The second structure maybe, for example but without limitation, a slat, a flap, a spoiler, and the like. The outer race 906 may have, for example but without limitation, a ring shape, a cylinder shape, and the like. The outer race 906 may comprise an outer race of, for example but without limitation, a ball bearing, a spherical bearing, a roller bearing, a needle bearing, a bushing, a journal bearing, and the like. The outer-race inner surface 908 may comprise, for example but without limitation, a concave spherical section, a ring, or the like.

As shown in FIG. 10, the swaging grooves 912 are located on the outer-race side face 910. A surface finish of the swaging grooves 912 is preferably relatively rough with respect to the inner-race outer surface 918. The swaging grooves 912 may have, without limitation, a finish of about 0.0008128 millimeters Ra labout 32 microinches Ra), while the inner-race outer surface 918, may have, without limitation, a surface finish of about 0.0002032 millimeters Ra (about 8 microinches Ra).

The conditionally non-conductive bearing liner 914 (coating 914) is wrapped or molded around corners of the outer-race inner surface 908 and the outer-race side face 910 and is extended to the swaging groove 912 to electrically protect the corner of the outer race 906. More specifically, the conditionally non-conductive bearing liner 914 covers the outer-race side face 910 of the dielectric spherical bearing 900 (or bushing) to electrically isolate the outer race 906 from the inner race 904 (spherical ball 904), and from other attachment hardware such as the pins or bolts. In this manner, the dielectric spherical bearing 900 provides dielectric barriers from the spherical ball 904 of the dielectric spherical bearing 900 to the outer race 906 and from other attachment hardware such as the pins or bolts according to an embodiment of the disclosure.

The conditionally non-conductive bearing liner 914 may be bonded to the outer-race inner surface 908 and the outer-race side face 910. The conditionally non-conductive bearing liner 914 may be made from a non-stick material with low friction characteristics such as, for example but without limitation, polytetrafluoroethylene (PTFE) (TEFLON), plastic, ceramic, PEEK, Nylon, Biaxially-oriented polyethylene terephthalate (BoPET) (MYLAR), Acrylic, Sealant, Polysulfide, silicon, Bonded isolation, Phenolic, a mechanically fastened isolating seal, a conductive material coated by a conditionally non-conductive material, and the like. Thickness of the conditionally non-conductive bearing liner 914 may be, for example but without limitation, about 0.0254 centimeters (about 0.010 inches) to about 0.0508 centimeters (about 0.020 inches).

FIGS. 12-16 are illustrations of various dielectric spherical bearings according to various embodiments of the disclosure. Each of the embodiments shown in FIGS. 12-16 has a structure that is similar to the dielectric spherical bearing 900 shown in FIGS. 9-11. Therefore common features, functions, and elements may not be redundantly described here.

Figure 12:
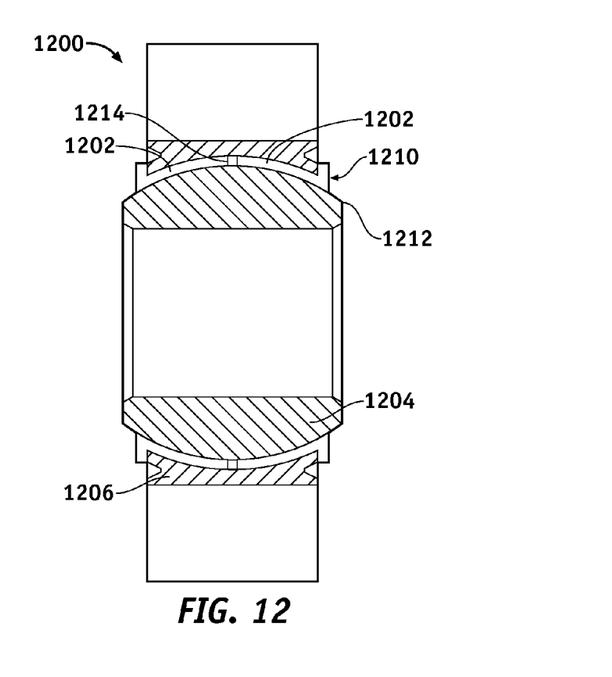
FIG. 12 is an illustration of a cross sectional view of an exemplary dielectric spherical bearing showing a conditionally non-conductive insert according to an embodiment of the disclosure.

FIG. 12 is an illustration of a cross sectional view of an exemplary dielectric spherical bearing 1200 showing conditionally non-conductive inserts 1202 according to an embodiment of the disclosure. The conditionally non-conductive inserts 1202 may be coupled to the inner race 1204, the outer race 1206, and at least one of the inner-race side face 1212 and the outer-race side face 1210. The conditionally non-conductive inserts 1202 may be inserted from the sides of the dielectric spherical bearing 1200 in between the inner race 1204 and the outer race 1206. A plurality of holes or areas 1214 where current flow over a voltage threshold can occur in the event of high energy strike may be included in the conditionally non-conductive inserts 1202. In this manner the holes 1214 allow current flow if the voltage across the inner race 1204 and the outer race 1206 exceeds the voltage threshold. The voltage threshold may be, for example but without limitation, about 300V. The conditionally non-conductive inserts 1202 may be made, for example but without limitation, from a conductive material, such as, metal coated by a conditionally non-conductive finish. The metal may be, for example but without limitation, copper beryllium copper alloy or a precipitation hardened stainless steel, and the like. The conditionally non-conductive finish may be without limitation, PTFE, ceramic, and the like.

Figure 13:
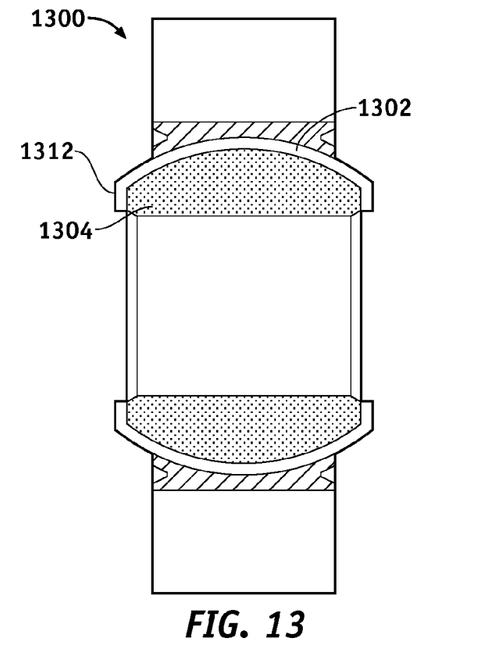
FIG. 13 is an illustration of a cross sectional view of an exemplary dielectric spherical bearing showing a conditionally non-conductive coating on an inner race according to an embodiment of the disclosure.

FIG. 13 is an illustration of a cross sectional view of an exemplary dielectric spherical bearing 1300 showing a conditionally non-conductive coating 1302 on the inner race 1304 according to an embodiment of the disclosure. The conditionally non-conductive coating 1302 may be extended to an inner-race side face 1312. The conditionally non-conductive coating 1302 may be formed from, for example but without limitation, PTFE, TEFLON, ceramic, plastic, PEEK, and the like.

Figure 14:
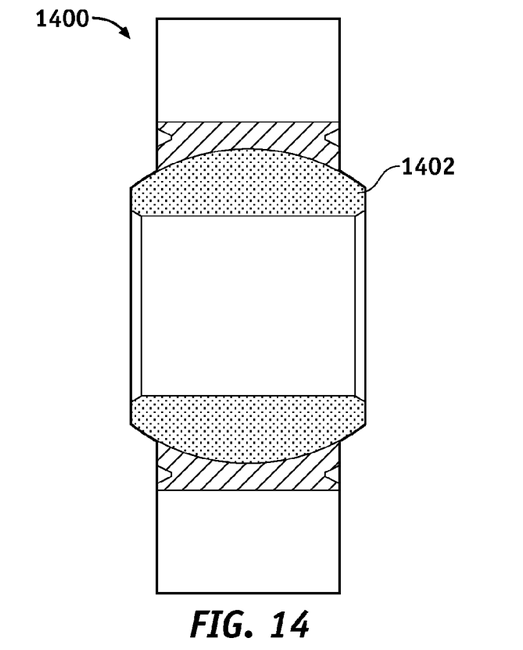
FIG. 14 is an illustration of a cross sectional view of an exemplary dielectric spherical bearing showing a conditionally non-conductive inner race according to an embodiment of the disclosure.

FIG. 14 is an illustration of a cross sectional view of an exemplary dielectric spherical bearing 1400 showing a conditionally non-conductive inner race 1402 according to an embodiment of the disclosure. The conditionally non-conductive inner race 1402 may be formed from, for example but without limitation, plastics, ceramic, peek, and the like.

Figure 15:
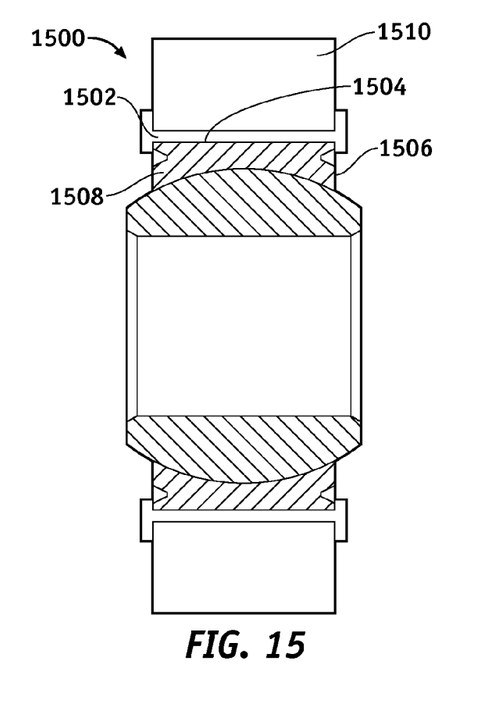
FIG. 15 is an illustration of a cross sectional view of an exemplary dielectric spherical bearing showing a conditionally non-conductive coating/insert on an outer surface and side face of an outer race, and on a track structure according to an embodiment of the disclosure.

FIG. 15 is an illustration of a cross sectional view of an exemplary dielectric spherical bearing 1500 showing a conditionally non-conductive coating/insert 1502 on an outer surface 1504 and side face 1506 of an outer race 1508, and extended to a portion of track (second) structure 1510 according to an embodiment of the disclosure.

Figure 16:
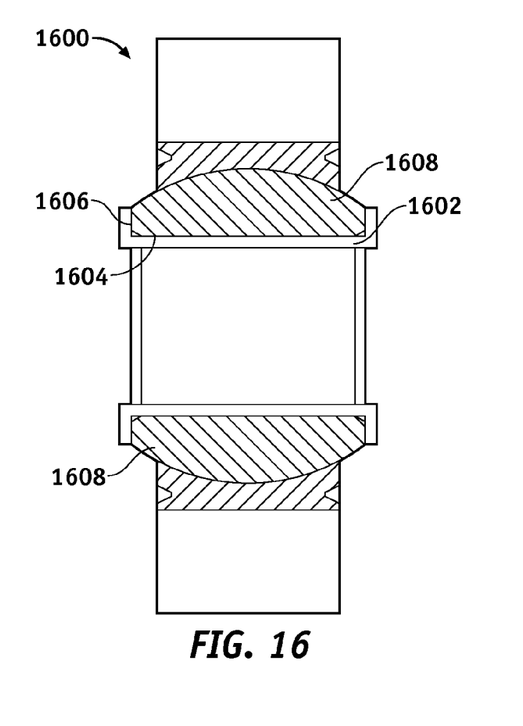
FIG. 16 is an illustration of a cross sectional view of an exemplary dielectric spherical bearing showing a conditionally non-conductive coating/insert on an inner surface and side face of an inner race according to an embodiment of the disclosure.

FIG. 16 is an illustration of a cross sectional view of an exemplary dielectric spherical bearing 1600 showing a conditionally non-conductive coating/insert 1602 on an inner surface 1604 and side face 1606 of an inner race 1608, according to an embodiment of the disclosure.

Figure 17:
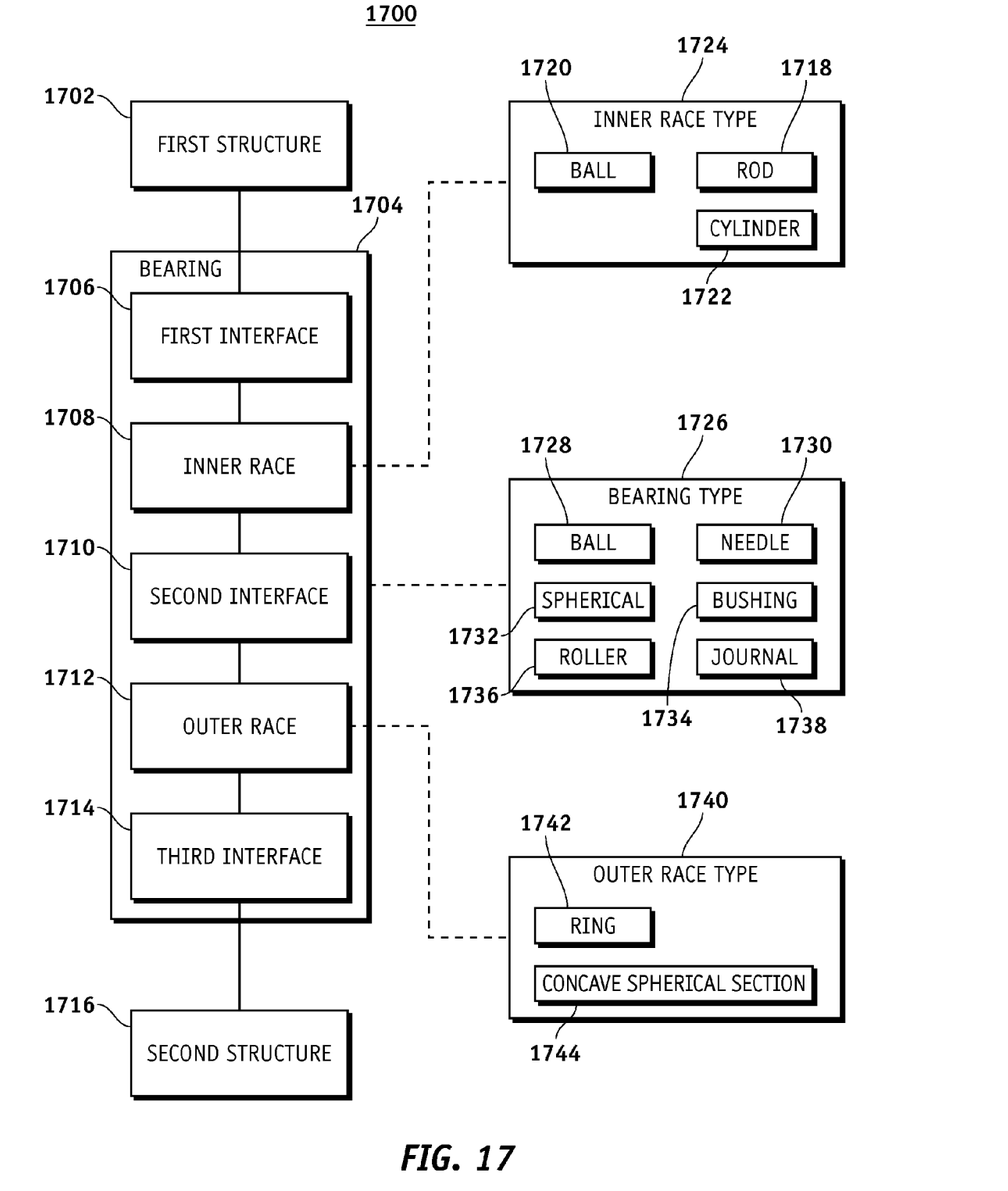
FIG. 17 is an illustration of a functional block diagram showing a conditionally non-conductive bearing according to various embodiments of the disclosure.

FIG. 17 is an illustration of a functional block diagram 1700 showing a conditionally non-conductive bearing 1704 (bearing 1704) according to various embodiments of the disclosure. The bearing 1704 is a generalization of the embodiments shown in FIGS. 10 and 12-16. The functional block diagram 1700 may have functions, material, and structures that are similar to the embodiments shown in FIGS. 4-17. Therefore common features, functions, and elements may not be redundantly described here.

The bearing 1704 allows conditional conductivity between a first structure 1702 and a second structure 1716. The bearing 1704 comprises a first interface 1706, an inner race 1708, a second interface 1710, an outer race 1712, and a third interface 1714. The bearing 1704 may comprise bearing type 1726. Each of the embodiments shown in FIGS. 10 and 12-16 can be applied to the bearing type 1726, such as but without limitation, ball bearings 1728, needle bearings 1730, spherical bearings 1732 (which may be lubricated spherical bearings), bushings 1734, roller bearings 1736, journal bearings 1738, and the like.

The first interface 1706 comprises an interface between the first structure 1702 and the inner race 1708. The embodiment shown in FIG. 16 provides conditional isolation at the first interface 1706 (1602 in FIG. 16).

The inner race 1708 may have an inner race type 1724 with a shape of, for example but without limitation, a rod 1718, a ball 1720, a cylinder 1722, and the like. For example, the embodiment shown in FIG. 14 provides conditional isolation at the inner race 1708 (1402 in FIG. 14).

The second interface 1710 comprises an interface between the inner race 1708 and the outer race 1712. For example, the embodiments shown in FIGS. 10, 12, and 13 provide conditional isolation at the second interface 1710 (914 in FIG. 10, 1202 in FIG. 12, and 1302 in FIG. 13 respectively).

The outer race 1712 may comprise outer race type 1740, such as but without limitation, a ring 1742, a concave spherical section 1744, or the like.

The third interface 1714 comprises an interface between the outer race 1712 and the second structure 1716. For example, the embodiment shown in FIG. 15 provides conditional isolation at the third interface 1714 (1502 in FIG. 15).

The first interface 1706, the second interface 1710, and the third interface 1714 may be made, for example but without limitation, from any of the material discussed in the context of discussion of FIGS. 9-11 above.

Figure 18:
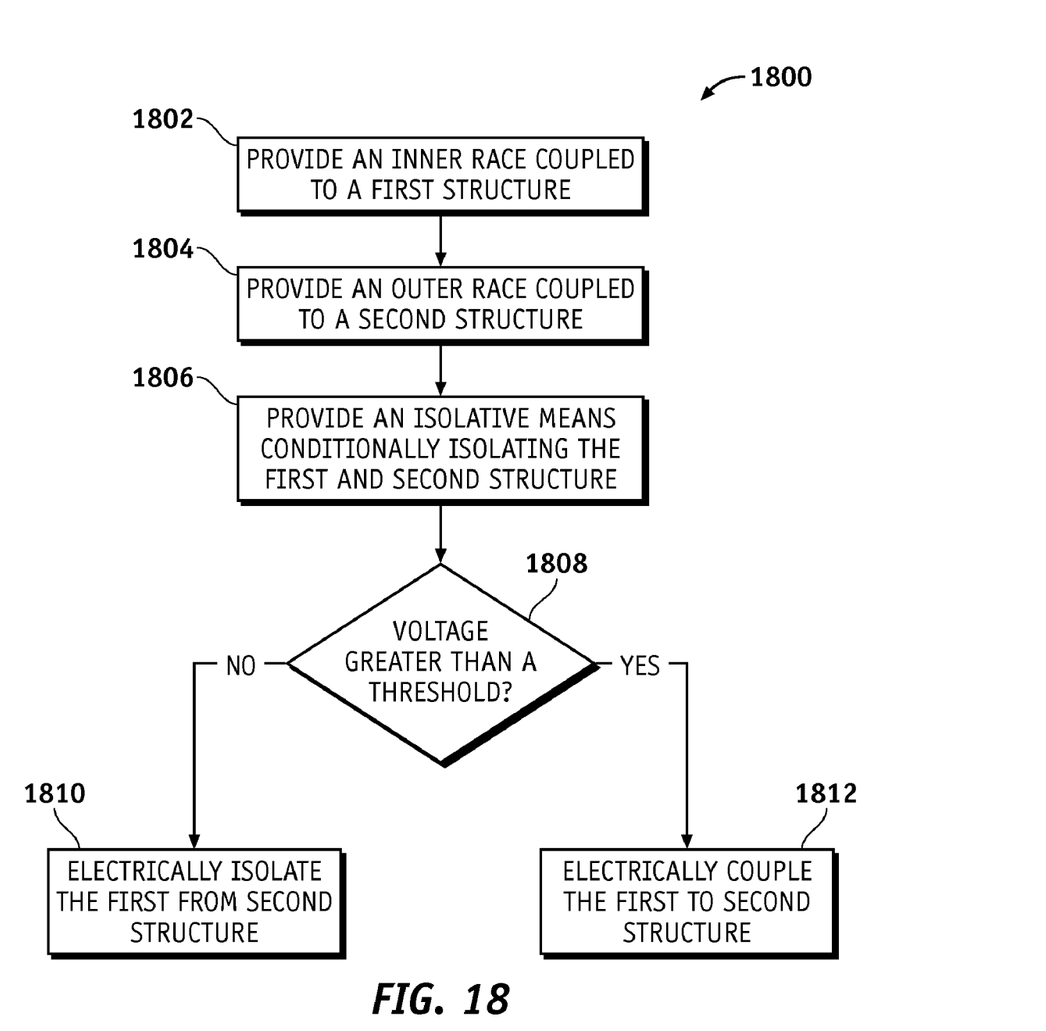
FIG. 18 is an illustration of a flowchart showing an exemplary process for providing electrical isolation for a conditionally non-conductive dielectric bearing according to an embodiment of the disclosure.

FIG. 18 is an illustration of a flowchart showing an exemplary process 1800 for providing electrical isolation for a conditionally non-conductive bearing according to an embodiment of the disclosure. The various tasks performed in connection with process 1800 may be performed by software, hardware, firmware, or any combination thereof. For illustrative purposes, the following description of process 1800 may refer to elements mentioned above in connection with FIGS. 1-2 and 7-17. In practical embodiments, portions of process 1800 may be performed by different elements of conditionally non-conductive bearings such as the bearings 900-1600 and/or the bearing 1704. Process 1800 may have functions, material, and structures that are similar to the embodiments shown in FIGS. 4-17. Therefore common features, functions, and elements may not be redundantly described here.

Process 1800 may begin by providing an inner race (i.e., 1708 in FIG. 17) coupled to a first structure (task 1802). Process 1800 may continue by providing an outer race (i.e., 1712 in FIG. 17) coupled to a second structure (task 1804).

Process 1800 may continue by providing an isolative means (i.e., the first interface 1706, the second interface 1710, and/or the third interface 1714 in FIG. 17) conditionally isolating the first structure from the second structure (task 1806). For example but without limitation, a conditionally non-conductive coating may be placed on the outer-race (or ring) inner surface and the outer-race side face of the conditionally non-conductive bearing. The conditionally non-conductive coating may be added to the bearing by, for example but without limitation, molding the conditionally non-conductive coating, or wrapping and bonding a fabric to the various surfaces of the bearing and support structures. More specifically, the coating can be coated by, for example but without limitation, a wrapped fabric, a three part bonded liner, a molded or machined homogeneous liner, and the like. In the wrapped fabric, the side face liner material can be extended beyond the initial geometry for lining the bore, where the extra material would be woven to allow the material to turn about 90 degrees around an edge of the outer race, and bond. In the three-part-bonded liner, a washer made of a molded or fabric base can be bonded to the outer-race side face (i.e., 910 in FIG. 10 of the dielectric spherical bearing 900), where the side face conditionally non-conductive liner and a liner in the bearing can be integrated by bonding with a resin.

In the molded or machined homogeneous liner, a liner is molded between the spherical ball and the outer race, and a parting agent is used to allow the spherical ball to move after the liner has set. The side face could be molded using a molding washer with an internal relief on each side face that would allow the resin to flow beyond current limits, up and around each side face. Once the liner has set up, the molding washer could be removed. A machining step may be incorporated to bring the liner to finished size.

Process 1800 may then continue by determining if an electrical voltage is greater than a voltage threshold (inquiry task 1808). Process 1800 electrically isolates the first structure from the second structure (task 1810), if the electrical voltage (first electrical voltage) is less than the voltage threshold. However, process 1800 electrically couples the first structure to the second structure (task 1812), if the electrical voltage (second electrical voltage) is greater than the voltage threshold, thereby allowing electrical conductivity. The voltage threshold may be, for example but without limitation, about 300 volts.

For example, process 1800 provides electrical isolation between a slat and a slat track for lower voltages (first electrical voltage) for bonding and grounding purposes, while providing a conductive path for electromagnetic effects purposes such as conducting large voltages (second electrical voltage) of lightning strikes.

In this way, according to various embodiments of the disclosure, the conditionally non-conductive bearings such as the dielectric spherical bearing isolates current in normal use and is conductive during high-voltage-spike lightning. Therefore, in the event of a current leakage with electrical equipment, or lighting a sufficient ground path is provided to prevent electrical arcing to occur where fuel or vapor may be present. The conditionally non-conductive bearings provide sufficient grounding to dissipate the energy without damaging any sensitive electrical equipment that may be in the area.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 9-16 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for isolating electrical current in an aircraft structure, the system comprising:
   a first structure;
   a bearing coupled to the first structure, comprising:
      an inner race coupled to the first structure; and
      an outer race coupled to the inner race;
   a second structure coupled to the outer race; and
   a conditionally non-conductive means conditionally electrically isolating the first structure from the second structure, the inner race comprises an inner-race inner surface, an inner-race outer surface and an inner-race side face, and the outer race comprises an outer-race inner surface, an outer-race outer surface and an outer-race side face, the conditionally non-conductive means comprises a conditionally non-conductive material on the outer-race inner surface and the outer-race side face.

2. The system according to claim 1, wherein the conditionally non-conductive means is operable to electrically isolate the first structure from the second structure if a first electrical voltage is less than a voltage threshold, and electrically coupling the first structure to the second structure if a second electrical voltage is greater than the voltage threshold.

3. The system according to claim 1, wherein the bearing comprises at least one of the group consisting of: a ball bearing, a spherical bearing, a roller bearing, a needle bearing, a bushing, and a journal bearing.

4. The system according to claim 1, wherein the insert comprises at least one hole operable for conducting current, if an electrical voltage is greater than a voltage threshold.

5. The system according to claim 1, wherein the conditionally non-conductive means comprises at least one of the group consisting of: PTFE, plastic, ceramic, PEEK, Polysulfide, silicon, Acrylic, Nylon, BoPET, Phenolic, and a mechanically fastened isolating seal.

6. A system for isolating electrical current in an aircraft structure, the system comprising:
  a first structure;
  a bearing coupled to the first structure, comprising:
    an inner race coupled to the first structure; and
    an outer race coupled to the inner race;
  a second structure coupled to the outer race; and
  a conditionally non-conductive means conditionally electrically isolating the first structure from the second structure, the inner race comprises an inner-race inner surface, an inner-race outer surface and an inner-race side face, and the outer race comprises an outer-race inner surface, an outer-race outer surface and an outer-race side face, the conditionally non-conductive means comprises a conditionally non-conductive coating on the outer-race outer surface, the outer-race side face, and a portion of the second structure near the outer race.

7. The system according to claim 6, wherein the conditionally non-conductive means:
  electrically isolates the first structure from the second structure, if a first electrical voltage is less than a voltage threshold; and
  electrically couples the first structure to the second structure, if a second electrical voltage is greater than the voltage threshold.

8. The system according to claim 6, wherein the insert comprises at least one of the group consisting of: PTFE, plastic, ceramic, PEEK, Polysulfide, silicon, Acrylic, Nylon, BoPET, Phenolic, and a mechanically fastened isolating seal.

9. A method of providing conditional electrical isolation for a bearing, the method comprising:
  providing an inner race coupled to a first structure;
  providing an outer race coupled to a second structure; and
  providing an isolative means conditionally electrically isolating the first structure from the second structure, the inner race comprises an inner-race outer surface and an inner-race side face, and the outer race comprises an outer-race inner surface and an outer-race side face, the isolative means comprises a conditionally non-conductive material on the outer-race inner surface and the outer-race side face.

10. The method according to claim 9, further comprising:
  electrically isolating the first structure from the second structure, if a first electrical voltage is less than a voltage threshold; and
  electrically coupling the first structure to the second structure, if a second electrical voltage is greater than the voltage threshold.

11. The method according to claim 9, wherein the insert comprises at least one of the group consisting of: PTFE, plastic, ceramic, PEEK, Polysulfide, silicon, Acrylic, Nylon, BoPET, Phenolic, and a mechanically fastened isolating seal.

* * * * *